United States Patent [19]

Bencheck et al.

[11] Patent Number: 5,796,723

[45] Date of Patent: Aug. 18, 1998

[54] SYSTEM AND METHOD FOR END-TO-END THRESHOLD SETTING

[75] Inventors: Michael Bencheck, Garland; Robert Branton, Farmers Branch; Curtis Brownmiller, Richardson; Mark DeMoss, The Colony; Steve Landon, Richardson; Minh T. Tran, Plano, all of Tex.

[73] Assignee: MCI Communications Corporation, Washington, D.C.

[21] Appl. No.: 670,845

[22] Filed: Jun. 28, 1996

[51] Int. Cl.⁶ .................................. H04J 3/14; H04L 12/26
[52] U.S. Cl. .................................. 370/252; 395/185.01
[58] Field of Search ........................... 370/229, 230, 370/231, 235, 236, 252, 253, 241, 242, 216, 245, 244; 395/180, 181, 183.01, 184.01, 185.01, 185.03, 185.04; 340/825.06, 825.16

[56] References Cited

U.S. PATENT DOCUMENTS

| | | |
|---|---|---|
| 4,937,825 | 6/1990 | Ballard et al. . |
| 4,964,112 | 10/1990 | Appelmann et al. . |
| 5,029,164 | 7/1991 | Goldstein et al. ............ 370/252 |
| 5,042,027 | 8/1991 | Takase et al. ............ 370/252 |
| 5,157,667 | 10/1992 | Carusone, Jr. et al. . |
| 5,189,674 | 2/1993 | Shimizu . |
| 5,212,475 | 5/1993 | Thoma ............ 340/825.16 |
| 5,233,604 | 8/1993 | Ahmadi et al. ............ 370/252 |
| 5,267,232 | 11/1993 | Katsube et al. ............ 370/252 |
| 5,274,367 | 12/1993 | Hermann et al. ............ 340/825.08 |
| 5,299,201 | 3/1994 | Carusone, Jr. et al. . |
| 5,359,592 | 10/1994 | Corbalis et al. ............ 370/252 |
| 5,412,652 | 5/1995 | Lu . |
| 5,436,909 | 7/1995 | Dev et al. . |
| 5,452,306 | 9/1995 | Turudic et al. . |
| 5,455,832 | 10/1995 | Bowmaster . |
| 5,463,634 | 10/1995 | Smith et al. . |
| 5,473,596 | 12/1995 | Garafola et al. . |
| 5,483,520 | 1/1996 | Eychenne et al. . |
| 5,566,162 | 10/1996 | Gruber et al. . |
| 5,619,489 | 4/1997 | Chang et al. ............ 370/241 |

OTHER PUBLICATIONS

Banerjee et al., "ISDN Primary Rate Access Maintenance," *IEEE*, 1989, pp. 2.6.1–2.6.5.

Cadieux et al., "A New Network Element for Performance Monitoring and Test Access Spanning the Digital Hierarchy," *IEEE*, pp. 324.4.1–334.4.5.

Kerschberg et al., "Intelligent Network Management: A Heterogenous Knowledge Source Approach," *IEEE*, pp. 314–316.

Mageed et al., "Fault Detection and Identification Using a Hierarchial Neural Network–Based System," *IEEE*, 1993, pp. 338–343.

*Primary Examiner*—Ajit Patel

[57] ABSTRACT

A system and method for performance monitoring of a telecommunications network that uses a layered performance monitoring structure. First, the monitoring points within the network are identified according to a customer request. The customer request is used to generate a service provisioning request, which indicates the path endpoints and the desired level of service. If the service is a digital data service and is supported for monitoring purposes, the network elements closest to the path endpoints are identified as primary monitoring points and activated, and based upon the desired level of service, a number of intermediate secondary points along the path are also identified but not activated. If the service is not a digital data service but the customer desires monitoring, then monitoring points are similarly identified and activated. Second, an end-to-end threshold is set for each service requiring thresholding per the service provisioning request. Third, previously identified secondary monitoring points are activated in the event that a degradation or failure is detected at the path endpoints. Upon an indication of trouble, the higher performance monitoring layers command the lower layers to perform trouble isolation processing, during which the lower layers determine which secondary monitoring points must be activated to determine the origin of the problem. The higher layers command the lower layers to commence activation.

16 Claims, 15 Drawing Sheets

SYSTEM AND METHOD FOR END-TO-END THRESHOLD SETTING

CROSS-REFERENCE TO OTHER APPLICATIONS

The following applications of common assignee contain some common disclosure:

"System and Method for Identifying the Technique Used for Far-End Performance Monitoring of a DS1 at a Customer Service Unit," filed Jun. 25, 1996, U.S. application Ser. No. 08/671,028.

"System and Method for Formatting Performance Data In a Telecommunications System," filed Jun. 26, 1996, U.S. application Ser. No. 08/670,905.

"System and Method for Reported Root Cause Analysis", filed Jun. 28, 1996, U.S. application Ser. No. 08/670,844.

"System and Method for Unreported Root Cause Analysis," filed Jun. 28, 1996, U.S. application Ser. No.08/668,516.

"Enhanced Correlated Problem Alert Signals," filed Jun. 28, 1996, U.S. application Ser. No. 08/670,848.

"Correlated Problem Alert Signals," filed Jun. 28, 1996, U.S. application Ser. No.08/673,271.

"Raw Performance Monitor Correlated Problem Alert Signals," filed Jun. 28, 1996, U.S. application Ser. No. 08/670,847.

"Raw Performance Monitor Correlated Trouble Isolation," filed Jun. 28, 1996, U.S. application Ser. No. 08/672,812.

"System and Method for Unreported Trouble Isolation," filed Jun. 28, 1996, U.S. application Ser. No. 08/672,513.

"System and Method for Monitoring Point Identification," filed Jun. 28, 1996, U.S. application Ser. No. 08/672,512.

"System and Method for Monitoring Point Activation," filed Jun. 28, 1996, U.S. application Ser. No. 08/672,356.

"System and Method for Tracking and Monitoring Network Elements," filed Jun. 25, 1996, U.S. application Serial No. 08/671,029.

The above-listed applications are incorporated herein by reference in their entireties.

BACKGROUND OF THE INVENTION

1. Field of the Invention

The following invention relates generally to network management in a telecommunications system, and more specifically toward a system and method for (1) identifying monitoring points within a telecommunications network, (2) identifying end-to-end threshold levels for measuring and monitoring circuits, and (3) activating monitoring points when necessary.

2. Related Art

Telecommunication service providers (e.g., MCI Telecommunications Corporation) provide a wide range of services to their customers. These services range from the transport of a standard 64 kbit/s voice channel (i.e., DS0 channel) to the transport of higher rate digital data services (e.g., video). Both voice channels and digital data services are transported over the network via a hierarchy of digital signal transport levels. For example, in a conventional digital signal hierarchy 24 DS0 channels are mapped into a DS1 channel. In turn, 28 DS1 channels are mapped into a DS3 channel.

Routing of these DS1 and DS3 channels within a node of the network is performed by digital cross-connect systems. Digital cross-connect systems typically switch the channels at the DS1 and DS3 signal levels. Transmission of channels between nodes is typically provided via fiber-optic transmission systems. Fiber-optic transmission systems can multiplex a plurality of DS3 channels into a higher rate transmission over a single pair of fibers. In one example, signal formats for the fiber-optic transmission systems are defined by the manufacturer. These proprietary systems are referred to as asynchronous transmission systems.

Alternatively, a fiber-optic transmission system can implement the synchronous optical network (SONET) standard. The SONET standard defines a synchronous transport signal (STS) frame structure that includes overhead bytes and a synchronous payload envelope (SPE). One or more channels (e.g., DS1 and DS3 channels) can be mapped into a SPE. For example, a single DS3 channel can be mapped into an STS-1 frame. Alternatively, 28 DS1 channels can be mapped into virtual tributaries (VTs) within the STS-1 frame.

Various STS-1 frames can be concatenated to produce higher rate SONET signals. For example, a STS-12 signal includes 12 STS-1 frames, while a STS-48 signal includes 48 STS-1 frames. Finally, after an STS signal is converted from electrical to optical, it is known as an optical carrier (OC) signal (e.g., OC-12 and OC-48).

An end-to-end path of a provisioned channel within a network typically traverses a plurality of nodes. This provisioned channel is carried over transmission facilities that operate at various rates in the digital signal hierarchy. For example, a provisioned DS1 channel may exist as part of a DS3, VT1.5, STS-1, STS-12, OC-12, and OC-48 signal along parts of the end-to-end path. This results due to the multiplexing and demultiplexing functions at each of the nodes.

One of the goals of a network management system is to monitor the performance of the provisioned channel. Performance of the provisioned channel can include various measures. One measure is the unavailability of the provisioned channel. Unavailability is generally defined as the amount (or fraction) of time that a channel is not operational. Various causes such as cable cuts can lead to channel downtime. Network responses to channel downtime can include automatic protection switching or various restoration procedures (e.g., digital cross-connect distributed restoration).

Although unavailability is a major performance measure from a customer's standpoint, other performance measures can also be critical. For example, if a customer desires a digital data service for the transmission of financial data, the number of errored seconds or severely errored seconds may be of concern.

In conventional network management systems, performance monitoring is accomplished in piecewise fashion. For example, consider a provisioned channel that traverses an end-to-end path comprising asynchronous transmission systems and SONET transmission systems. Performance monitoring information for these two types of transmission systems is typically maintained in separate databases. Moreover, the various types of transmission systems may be provided by multiple vendors. Each of these vendors may define their own separate performance monitoring process. For example, the vendor-controlled process may define the types of data that are retrieved from or reported by the individual network elements.

In this environment, comprehensive performance monitoring analysis is difficult to accomplish. What is needed is a network management system that can monitor provisioned channels at various points of the end-to-end paths and isolate the source of the problem that is causing the observable error activity. This capability allows a service provider to proactively address potential problems in network performance, thereby minimizing the impact on the customer's perception of the quality of the provisioned service.

SUMMARY OF THE INVENTION

The present invention is directed to a system and method for enhancing the performance monitoring system of a telecommunications network.

The first section is directed to a system and method for identifying monitoring points within the network according to a customer request. A service provisioning request is initiated based on a customer order. The service provisioning request designates the required bandwidth and the customer endpoints, between which service is to be provided. In addition, the provisioning request identifies the level or quality of service required for the service. In response to the service provisioning request, a path through the network elements of the network is determined, thereby defining a circuit topology. If a digital data service or any other service that requires monitoring is provisioned, then the process for identifying monitoring points commences. The primary monitoring points are identified at the network elements closest to the path endpoints. Secondary monitoring points, representing intermediate monitoring points along the path, are also identified based upon the level of service required by the service provisioning request. The primary monitoring points are then activated to provide monitoring information.

The second section is directed to a system and method for setting monitoring thresholds for services provisioned by the service provider. Criteria such as the circuit path length and the type of service are used to establish thresholds for a particular service. Each threshold can represent an acceptable tolerance level in the quality of service provided, beyond which level a service does not satisfy customer requirements provided in the service provisioning request. These customized thresholds are used by the primary and secondary monitoring points to determine when a provisioned service experiences unacceptable levels of degradation.

The third section is directed to a system and method for activating previously identified monitoring points in the event that a degradation or failure is detected at the path endpoints. When a degradation or failure is detected at the previously activated primary monitoring points, this information is provided to the higher layers of the performance monitoring system. The higher layers then request that the lower layers, which are in direct contact with the network elements, proceed in isolating the network problem. During isolation processing, the lower layers determine which secondary monitoring points must be activated to determine the origin of the problem. The higher layers are informed of the secondary monitoring points that must be activated by the lower layers, and accordingly submit requests for the lower layer to activate the required monitoring points.

BRIEF DESCRIPTION OF THE FIGURES

The present invention will be described with reference to the accompanying drawings, wherein.

DETAILED DESCRIPTION OF THE PREFERRED EMBODIMENTS

The present invention is directed to an improved system and method for enhancing the performance monitoring capabilities of a telecommunications network management system. Systems and methods are presented for: (1) identifying monitoring points within the network according to a customer request, (2) setting thresholds for services required by a customer along a network path, and (3) activating previously identified monitoring points in the event that a degradation or failure is detected at the path endpoints.

A telecommunications network can be divided into a mesh of network elements interconnected by digital circuits. Together, the network elements and digital circuits transmit information between customer locations.

More precisely, digital circuits refer to electrical framing structures corresponding to particular digital data bit rates. The higher the digital data bit rate, the more information that can be transmitted by a digital circuit. As shown in Table 1, a DS0 level circuit has a digital data bit rate of 0.064 megabits per second (Mbps). This 0.064 Mbps channel carries a single voice channel. As further illustrated in Table 1, a DS1 circuit can carry information at 1.544 Mbps, while a DS3 circuit can carry information at 44.736 Mbps. The DS0, DS1, and DS3 circuits are defined by the U.S.A. standard, which is also used in the countries of Australia, Canada and Japan.

TABLE 1

| USA Standard | | | CCITT Standard | | |
|---|---|---|---|---|---|
| Signal Level | Carrier System | Rate in Mbps | Signal Level | Carrier System | Rate in Mbps |
| DS0 | — | 0.064 | CEPT0 | — | 0.064 |
| DS1 | T1 | 1.544 | CEPT1 | E1 | 2.048 |
| DS3 | T3 | 44.736 | CEPT2 | E3 | 34.368 |

Table 1 also shows the digital bit rate in Mbps for CEPT0–CEPT2 circuits, which are used in CCITT countries. Notably, the CEPT1 circuit, which has a rate of 2.048 Mbps, is commonly used in North America and is referred to by its carrier name as an E1 circuit.

Figure 1:
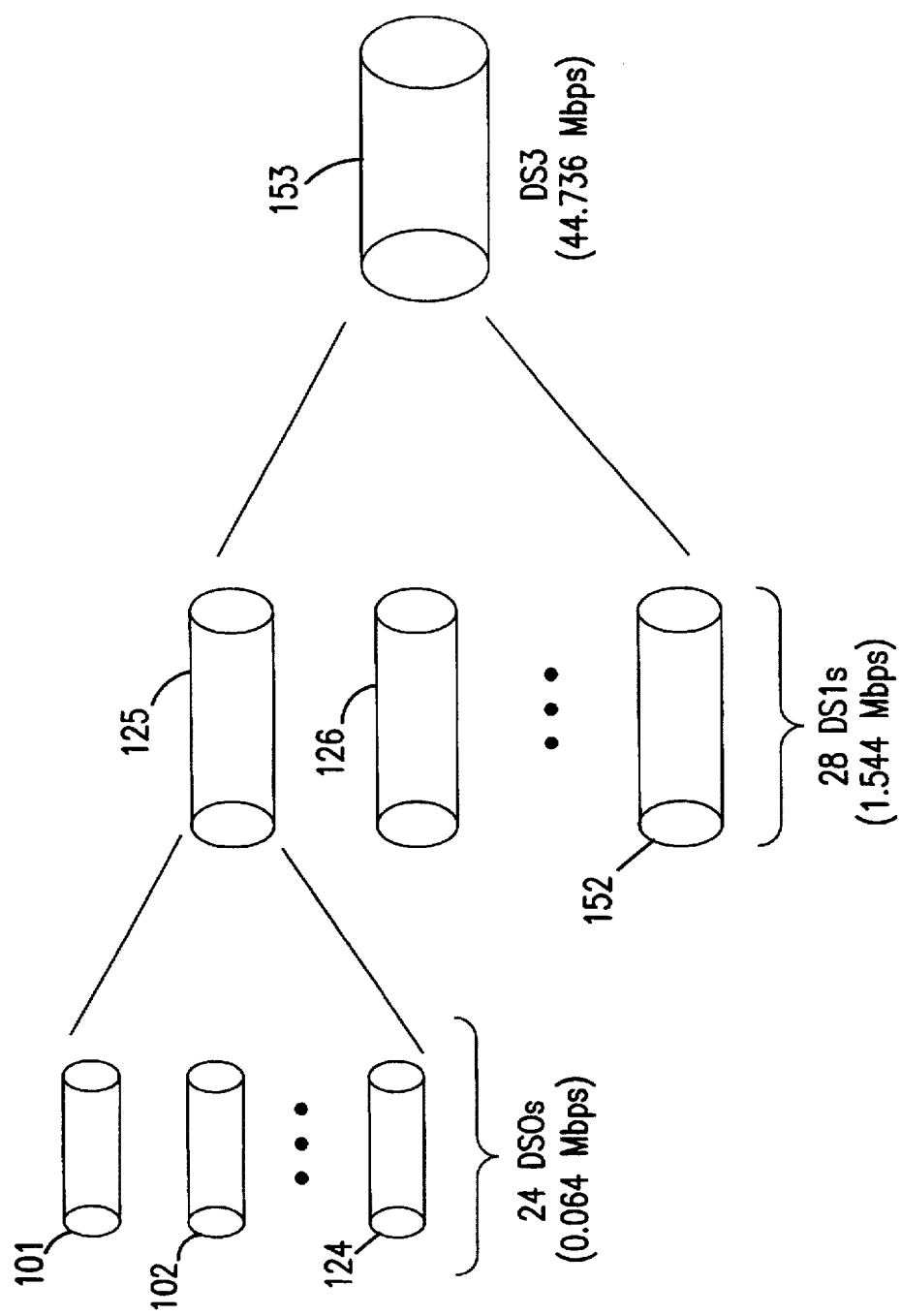
FIG. 1 illustrates the representative bit rates for a DS0, DS1, and DS3 circuits.

The higher the digital bit rate for a circuit, the more information that can travel over that circuit. As shown in FIG. 1, 24 DS0s 101–124 are mapped into a single DS1 circuit. In other words, the information carried on 24 DS0s can be carried on a single DS1 circuit. Similarly, 28 DS1 circuits 125–152 are mapped into a single DS3 circuit 153.

For asynchronous communications over DS-n and CEPT-n digital circuits, a path is defined as a framed digital signal between any two points. The path is considered to be independent of the physical transmission medium. For asynchronous communications over DS-n and CEPT-n digital circuits, a line is defined as the physical transport vehicle that provides the means for moving digital information between any two points. For example, the line may be represented by a bipolar signal traversing a metallic transmission medium.

Transmission over an optical fiber network or a digital microwave network is accomplished via proprietary protocols or by a standardized protocol known as SONET (synchronous optical network). SONET, which has become the ANSI and ITU standard, is a multi-leveled protocol that is used to transport high-speed signals with circuit switched synchronous multiplexing.

Figure 2:
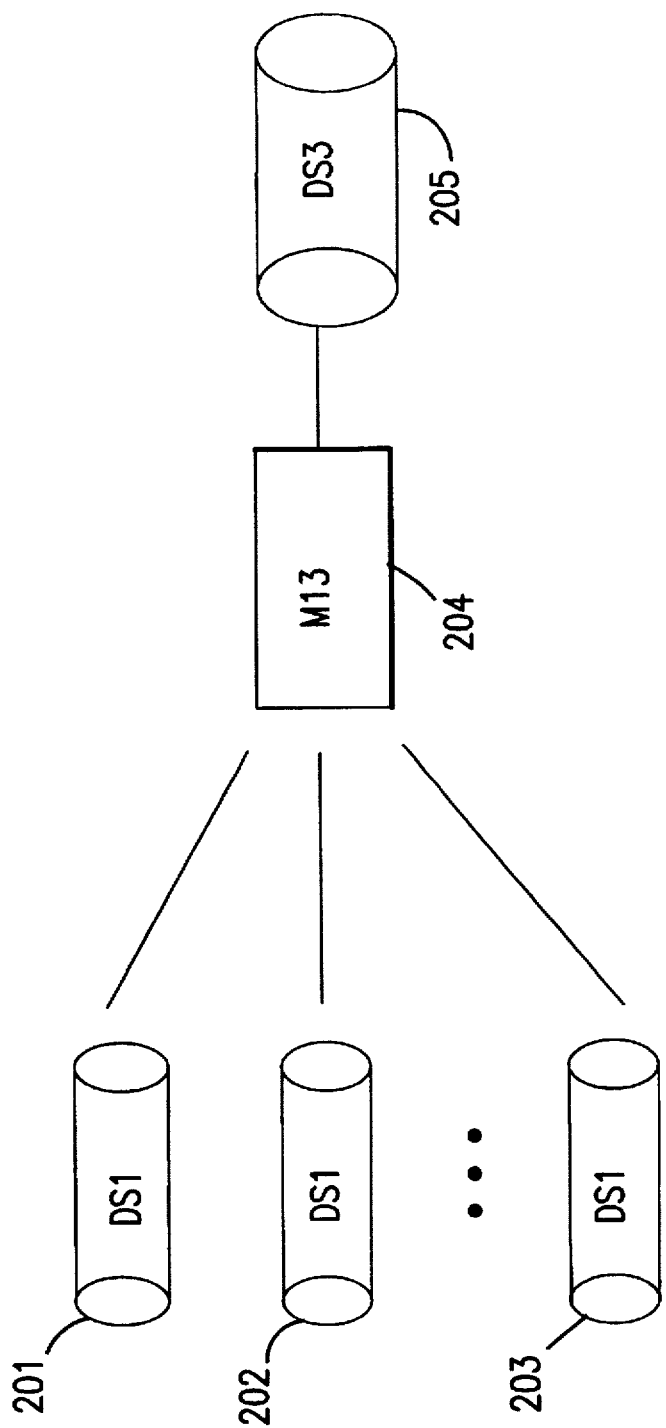
FIG. 2 illustrates the multiplexing of DS1 circuits into a DS3 circuit.

FIG. 2 shows an M13 multiplexer which receives a series of DS1 circuits 201–203 and multiplexes the circuits into a DS3 circuit 205. Instead of having digital bit rates of exactly 1.544 Mbps each as depicted in Table 1, DS1 circuits 201–203 typically vary from this amount by a tolerance of ±75 bits per second. To synchronize the asynchronous signals traversing DS1 circuits 201–203, the M13 multiplexer will add extra bits in a process known as "bit stuffing."

Because of the extra bits that have been added, an intermediate network node between the origin and destination of a signal must first demultiplex the entire set of channels in order to select a single channel. Therefore, an intermediate node attempting to drop a channel or add a channel from a signal string needs an M13 multiplexer to demultiplex the signal, a patch to cross-connect the signal, and another M13 multiplexer to re-multiplex the new signal stream.

Since equipment using the SONET protocol performs synchronous multiplexing, no bit stuffing is necessary. This promotes visibility of lower rate channels without demultiplexing. Therefore, SONET networks can use ADMs (add/drop multiplexers) which are capable of extracting only those channels that are desired, allowing the remainder of the channels to remain undisturbed.

SONET networks are defined by paths, lines, and sections. A SONET path is an end-to-end logical link between customer locations. A SONET line is a connection between two network nodes that multiplex, synchronize, switch, and cross-connect SONET signals. A SONET path comprises one or more lines. A SONET section is a link between network elements that perform signal regeneration, framing, scrambling, and fault location within the network. One or more SONET sections comprise a SONET line.

Table 2 shows the physical interfaces used for a SONET network. An STS (synchronous transport signal) refers to a digital SONET bit rate for transmission over an electrical medium. An OC (optical carrier) signal, which is a scrambled, optical version of an STS signal, refers to a digital SONET bit rate for transmission over an optical medium. Table 2 identifies an STS-1 and OC-1 frames as having a digital bit rate of 51.84 Mbps, STS-3 and OC-3 frames as having a digital bit rate of 155.52 Mbps, STS-12 and OC-12 frames as having a digital bit rate of 622.08 Mbps, and STS-48 and OC-48 frames as having a digital bit rate of 2488.32 Mbps. Higher rate SONET signals are also contemplated in the present invention.

TABLE 2

| Synchronous Transport Signal | Optical Carrier Designations | Line Rate in Mbps |
|---|---|---|
| STS-1 | OC-1 | 51.84 |
| STS-3 | OC-3 | 155.52 |
| STS-12 | OC-12 | 622.08 |
| STS-48 | OC-48 | 2488.32 |

Figure 3:
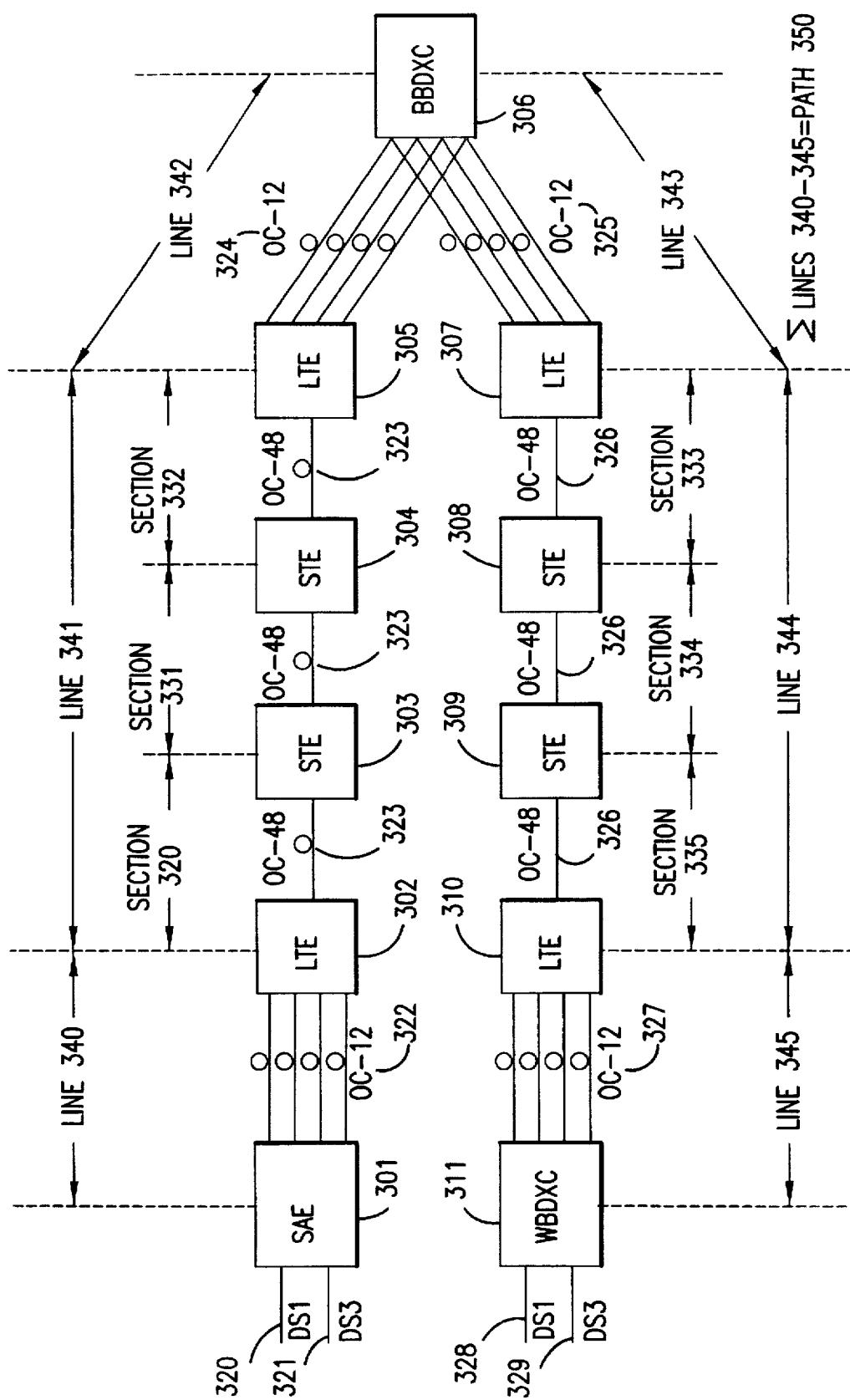
FIG. 3 illustrates the physical interfaces of a SONET network.

FIG. 3 illustrates exemplary network elements and digital circuits in a SONET network. LTEs (line terminating elements) 302, 305, 307, 310 are multiplexers used to terminate lines 340–345. STEs (section terminating elements) 303, 304, 308, 309 are regenerators that boost signals that have been attenuated by transmission over the optical fiber. SAE (SONET access element) 301 is a multiplexer used to multiplex DSI circuit 320 and DS3 circuit 321 into an OC-12 fiber optic connection 322. BBDCS (broad band digital cross-connect system) 306 provides direct synchronous switching at a cross-connect speed (matrix speed) of an STS-1 frame. WBDCS (wide band digital cross-connect system) 311 provides direct synchronous switching at a cross-connect speed (matrix speed) of a VT 1.5 frame (a portion of an STS frame, as defined below).

Figure 4:
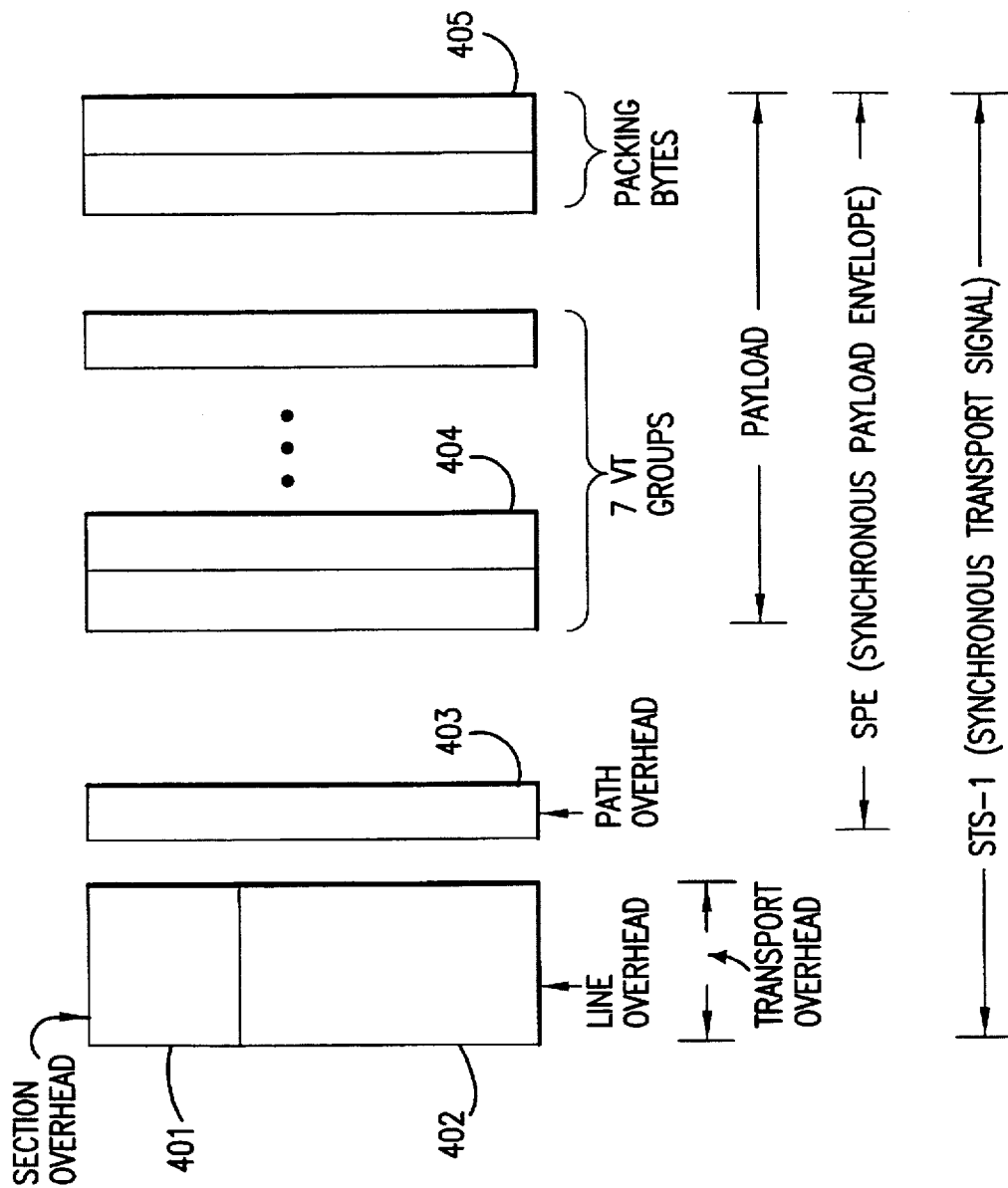
FIG. 4 illustrates a SONET STS-1 frame.

The SONET path 350 between a customer connected to SAE 301 and WBDCS 311 comprises the following SONET lines and sections:

(1) line 340 between SAE 301 and LTE 302 over OC-12 circuit 322;

(2) line 341 between LTE 302 and LTE 305 comprising:
 (a) section 330 between LTE 302 and STE 303 over OC-48 circuit 323;
 (b) section 331 between STE 303 and STE 304 over OC-48 circuit 323;
 (c) section 333 between STE 304 and LTE 305 over OC-48 circuit 323;

(3) line 342 between LTE 305 and BBDCS 306 over OC-12 circuit 324;

(4) line 344 between LTE 307 and LTE 310 comprising:
 (a) a section 333 between LTE 307 and STE 308 over an OC-48 circuit 326;
 (b) a section 334 between STE 308 and STE 309 over an OC-48 circuit 326;
 (c) a section 335 between STE 309 and LTE 310 over an OC-48 circuit 326;

(5) line 345 between LTE 310 and WBDCS 311 over an OC-12 circuit 325;

FIG. 4 shows a SONET STS-1 frame in detail. The STS-1 frame comprises a transport overhead and an SPE (synchronous payload envelope). The transport overhead comprises a section overhead 401 and a line overhead 402. The SPE comprises a path overhead 403, seven groups of data known as VTs (virtual tributaries), and a group of packing bytes 405 at the end of the VT groups.

Referring to FIG. 3, section overhead 401 is inserted and extracted at STEs 303, 304, 308, 309 and LTEs 302, 305, 307, 310, and BBDCS 306. Line overhead 402 is inserted and extracted at the line endpoints, including LTEs 302, 305, 307, 310, and BBDCS 306. Path overhead 403 is inserted and extracted only at the path endpoints, represented by SAE 301 and WBDCS 311.

Figure 5:
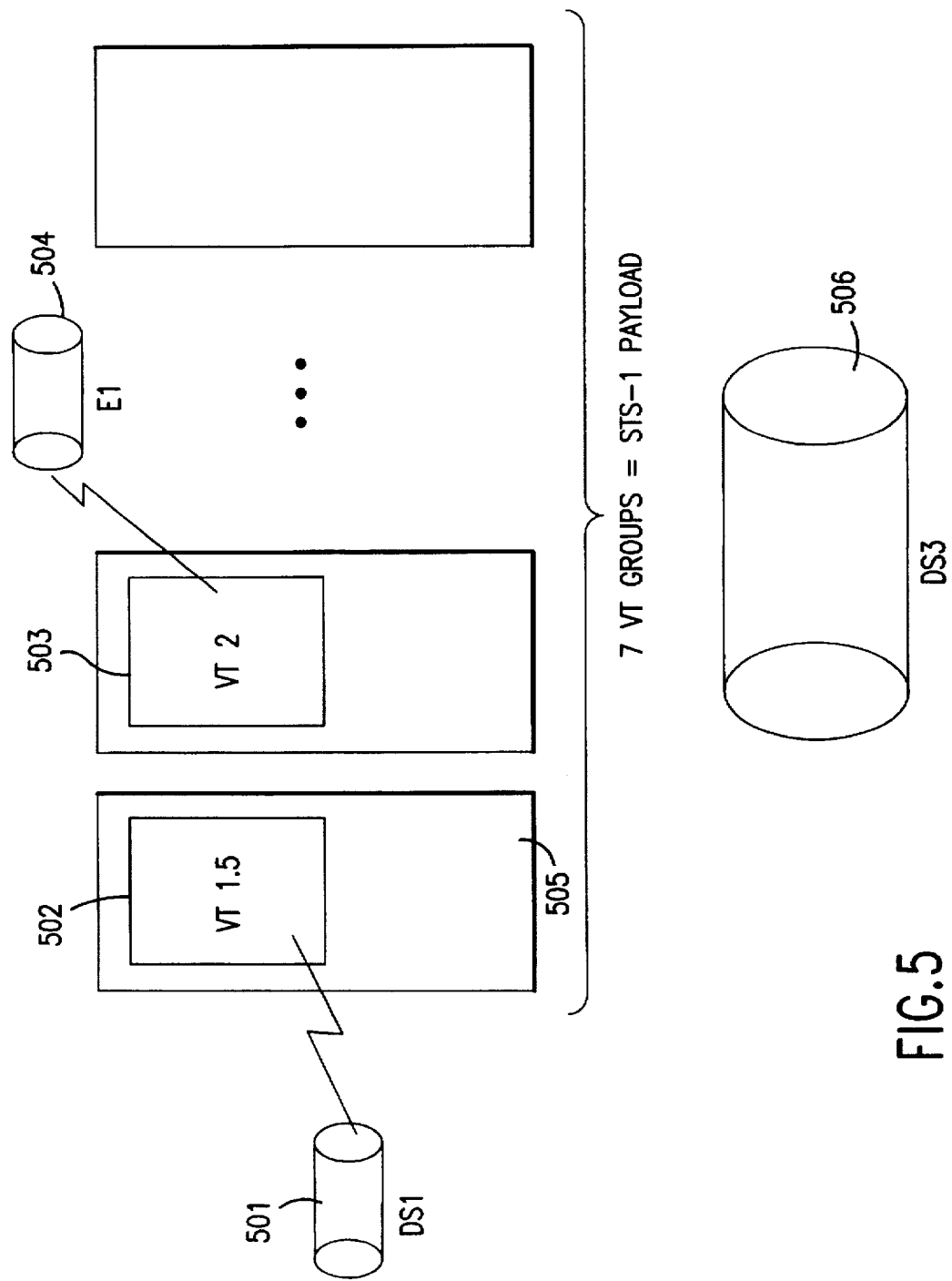
FIG. 5 illustrates a mapping of digital circuits into an STS-1 frame.

The actual data being transmitted can be carried in the VT groups, which are shown in greater detail in FIG. 5. A complete STS-1 payload comprises seven VT groups. The seven VT groups of an STS-1 payload can carry the equivalent information of a DS3 circuit. The VT groups can also be subdivided into subgroups. For example, VT1.5 502 can accommodate DS1 circuit 501. Similarly, VT2 503 can accommodate E1 circuit 504. Table 3 shows the VT types, their bit rates in Mbps, and the corresponding circuits which they can respectively accommodate.

TABLE 3

| VT (Virtual Tributary) Type | Rate in Mbps | Circuits Which can be Accommodated |
| --- | --- | --- |
| VT1.5 | 1.728 | DS1 |
| VT2 | 2.308 | E1 |
| VT6 | 6.912 | DS2 |

Figure 6:
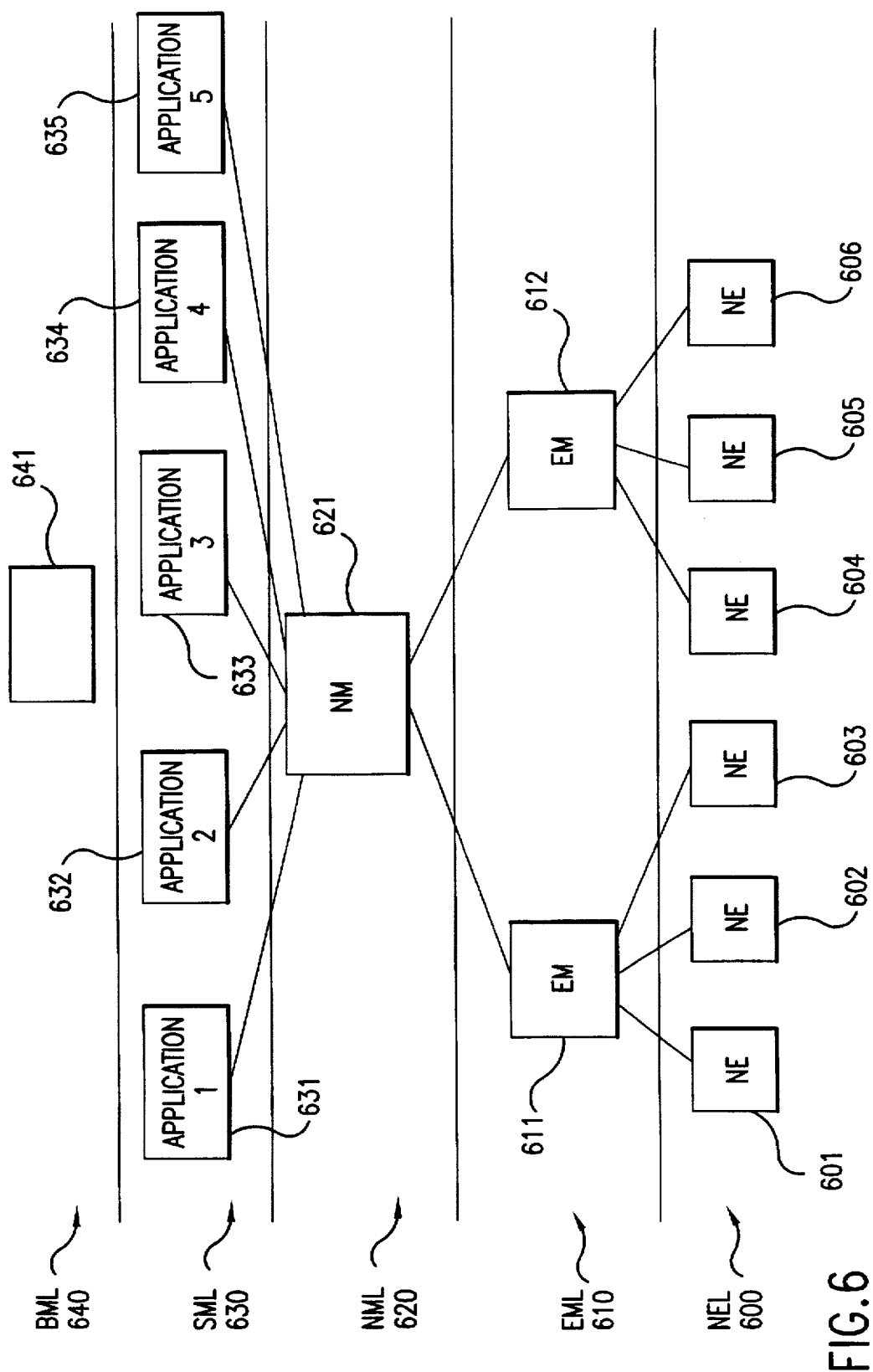
FIG. 6 is a block diagram illustrating the layers of the TMN standard.

Under the performance monitoring standard known as ITU-TMN (International Telecommunications Union—Telecommunications Management Network), network performance management is enhanced by providing network users remote access to the network. Referring to FIG. 6, the ITU-TMN performance management standard comprises five layers:

(1) network element layer (NEL) 600,
(2) element management layer (EML) 610,
(3) network management layer (NML) 620,
(4) service management layer (SML) 630,
(5) business management layer (BML) 640.

As shown in FIG. 6, the NEs consists of a plurality of network elements (NEs) 601–606. NEs 601–606 represent the physical portion of the telecommunications network. As mentioned above, the network elements include LTEs, STEs, SAEs, BBDCSs and WBDCSs, inter alia.

NEs 601–606 collect PM information for particular digital bit rates (e.g., DS1, DS3, E1, STS-N and OC-N). NEs 601–606 use error calculation methods to provide performance data on the facilities (circuits) that are provisioned through them. NEs 601–606 also provide different error calculation methods for the various digital bit rates.

Figure 7:
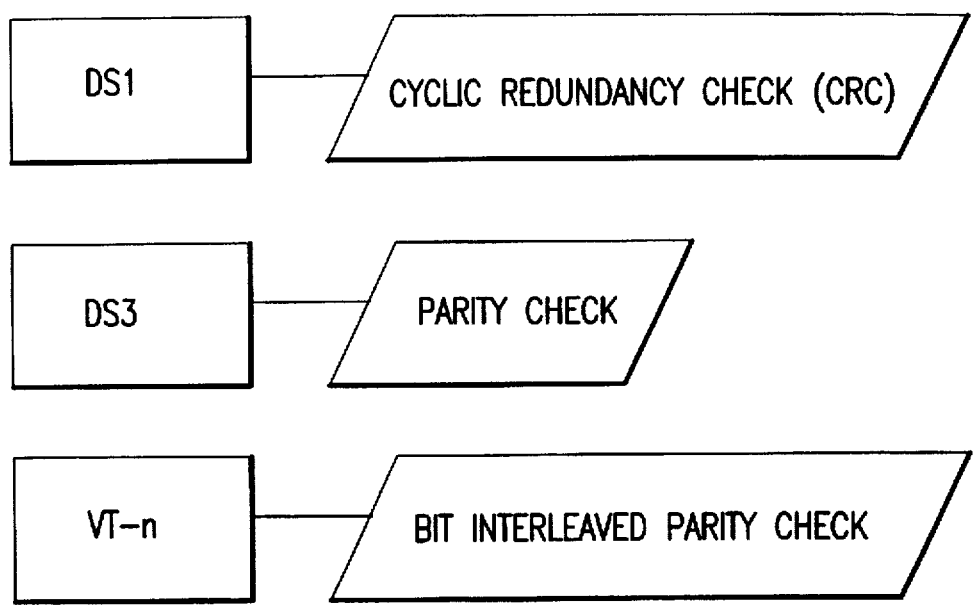
FIG. 7 illustrates raw performance measures for typical digital circuits.

FIG. 7 shows the typical raw performance measures for well-known digital bit rates. A cyclic redundancy check (CRC) is used to extract raw error performance data for a DS1 circuit. A parity check is used to extract raw error performance data for a DS3 circuit. A bit interleaved parity check is used to extract raw error performance data for a VT-n circuit. The raw performance data is processed by the NEs into the measurements of primitives and failures.

Primitives comprise anomalies and defects. An anomaly gives a measure of the discrepancy between the actual and desired characteristics of a message. Typical anomalies are bit error detection events and synchronization-related events. For example, a bit error detection event refers to a situation where a bit is transferred from a source to a destination within the correct assigned time slot, but the bit that is delivered is different from the value that was originally sent from the source.

A defect refers to some limited interruption in the ability of a telecommunications facility to perform a desired function. Hence, any successive anomalies causing a decrease in the ability of a facility to perform a required function result in a defect. Typical defects include loss of signal (LOS), and severely errored frame (SEF).

LOS occurs for a DS1 line interface when 175±75 contiguous pulse positions are detected, with no pulses having either positive or negative polarity. The severely errored frame (SEF) measure refers to the frequency of occurrence of an error in the bit position known as the framing bit for a particular timing window. For a DS1 circuit, an SEF defect is the occurrence of two or more frame bit errors in a window (which has a duration of 0.75 ms or 3.0 ms).

A failure refers to the complete termination in the ability of a telecommunications facility to perform a designated function. Failures can be local failures or remote failures. Local failures include near-end loss of frame (LOF) and near-end loss of signal (LOS). For a DS1 circuit, a near-end LOF failure is observed when an OOF (out of frame) defect persists for a period of 2.5±0.5 seconds (unless if an alarm indication signal (AIS) defect or failure is present). For a DS1 circuit, a near-end LOS signal is declared when an LOS defect persists for a period of 2.5±0.5 seconds.

It should be noted that different network telecommunications facilities may have different types of performance measures. For example, an STS-1 path uses the LOS failure measure, similarly to a DS1 circuit, but it also includes such measures as STS-path loss of pointer (LOP-P), line alarm indication signal (AIS-L), and STS-path AIS (AIS-P).

Referring to FIG. 6, the element management layer (EML) 610 comprises element managers (EMs) 611, 612. Each of the NEs 601–606 are connected to one of the EMs 611, 612 in the EML 610. For example, NEs 601–603 are connected to EM 611. In this manner, each network EM 611, 612 controls a portion of the physical network embodied in the NEL 600.

EMs 611, 612 can retrieve information from NEs 601–606 periodically or upon a user request. Alternatively, NEs 601–606 can be programed to provide EMs 611, 612 with a predefined subset of network management information at predefined time intervals. The domain of an EM 611, 612 can be defined by the vendor. In some situations, the domain of an EM 611, 612 is dictated by the geography in which NEs 601–606 reside.

After network management information is acquired by EMs 611, 612 from NEs 601–606, it is forwarded to the network management layer (NML) 620. NML 620 comprises network manager (NM) 621. NM 621 is logically shown as a single entity. In implementation, NM 621 can comprise one or more sites. For example, multiple service centers (not shown) can exist at different parts of the country (e.g., east coast and west coast). In combination, these national-level service centers combine to provide total visibility of the physical network in NEL 600. NM 621 can also be split among services and/or NEs. For example, a first NM may be dedicated to asynchronous parts of the network, a second NM may be dedicated to DS1, DS3 and VT-n traffic, and a third NM may be dedicated to STS-n and OC-n traffic.

Generally, the logical entity identified as NM 621 is a resource that is accessed by applications in the service management layer (SML) 630. In FIG. 6, SML 630 is shown to include five applications 631–635. Specifically, SML 630 includes configuration/provisioning application 631, accounting/billing application 632, security application 633, network performance application 634, and fault management application 635. This listing of applications is provided without limitation. Any other application that utilizes network management data stored within NEL 600 can also be included. Note that applications 631–635 can also be included in NML 620.

Configuration/provisioning application 631 provides a customer interface for the provisioning of various services. For example, a customer can indicate a desire for a DS1 digital data service between NE 601 and NE 605. Upon receipt of this customer request, provisioning application 631 relays the provisioning commands to NM 621. NM 621 then communicates with EMs 611, 612 and any other EMs that control a part of the end-to-end path to set up the DS1 connection from NEs 601–605.

Applications 632–635 can similarly support a customer interface by providing access to billing information, security information, performance information and fault management information, respectively. Each of these applications also access the resources that are stored within NM 621.

Finally, the network management system also includes business management layer (BML) 640. BML 640 includes logical entity 641. Logical entity 641 represents the general corporate policy of the network management system. Corporate policy 641 dictates the general business and contractual arrangements of the service provider.

Having identified the layers of a network management system, the monitoring aspects of the network management system are now described.

Monitoring Point Identification

A first aspect of the present invention is directed to a system and method for identifying the monitoring points of a telecommunications network.

Figure 8:
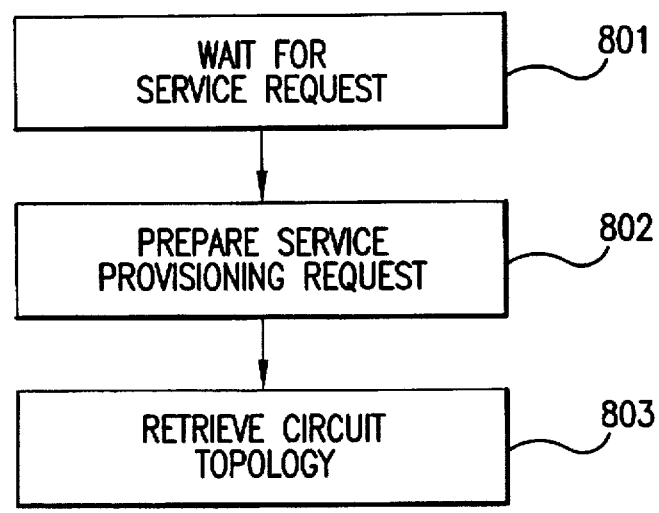
FIG. 8 is a flow chart illustrating initiation of a service provisioning request.

FIG. 8 shows a flow chart for initiation of the service provisioning request. In step 801, SML 630 waits for a service provisioning request. In this state, SML 630 waits for an order entry request from a customer requesting a telecommunications service.

In step 802, a service provisioning request is prepared by SML 630. A customer request is received by a telecommunications customer representative. The subsequent order entry is prepared into a service provisioning request by an SML 630 order entry application system (not shown). The service provisioning request specifies the connection and level of service required by the customer. Referring to FIG. 6, the service provisioning request may designate a connection between a customer having computers connected to NE 601 and NE 606.

In step 803, the circuit topology is retrieved. In response to the customer provisioning request, SML configuration management application 631 submits a request to NML 620 to determine the possible network paths that may be provisioned through the network.

Specifically, SML configuration management 631 submits a request to the NML 630 configuration management (not shown) to retrieve the circuit topology of the entire network. Since NML 630 has a full view of the entire network, NML 630 configuration management provides the required information to SML configuration management 631 via the configuration reporting task.

As part of its configuration reporting task, each EM 611, 612 configuration manager (not shown) continually updates the NML configuration management to make it aware of the status of the NEs 601–606 in its respective domain.

Figure 9A:
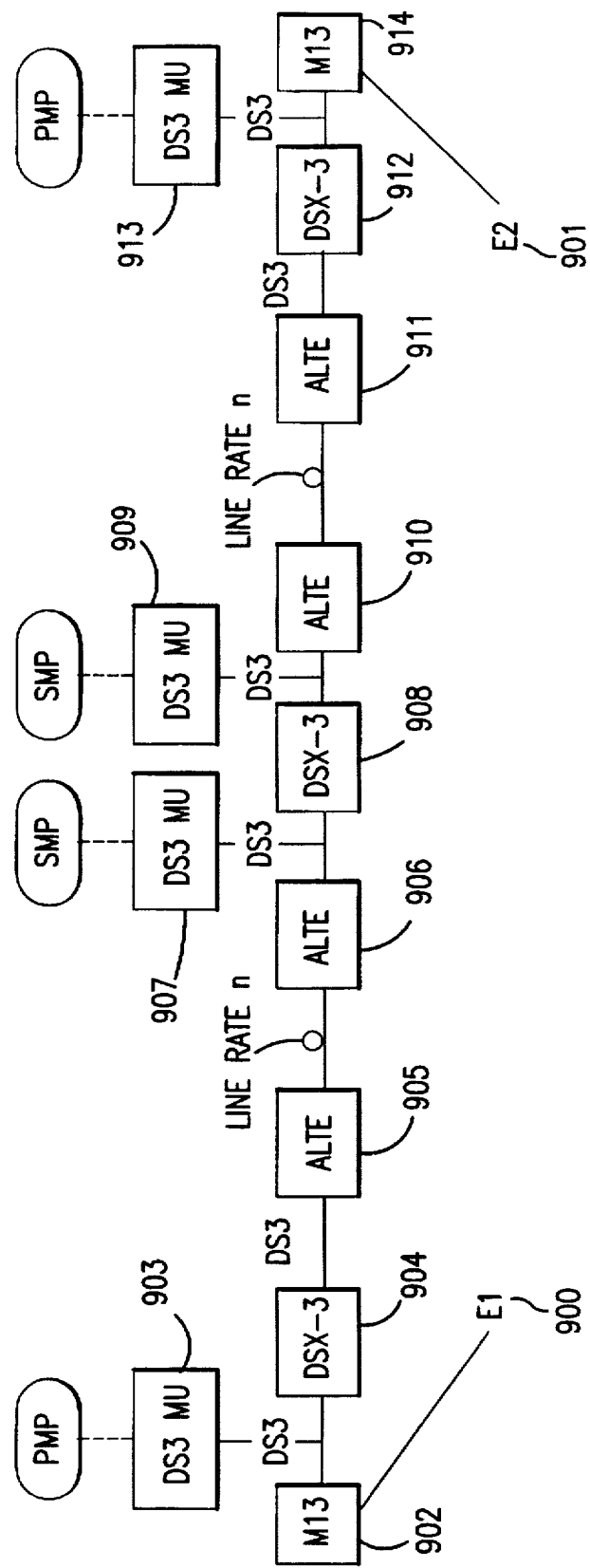
FIG. 9A illustrates the circuit topology between two endpoints along an asynchronous communication path.
Figure 9B:
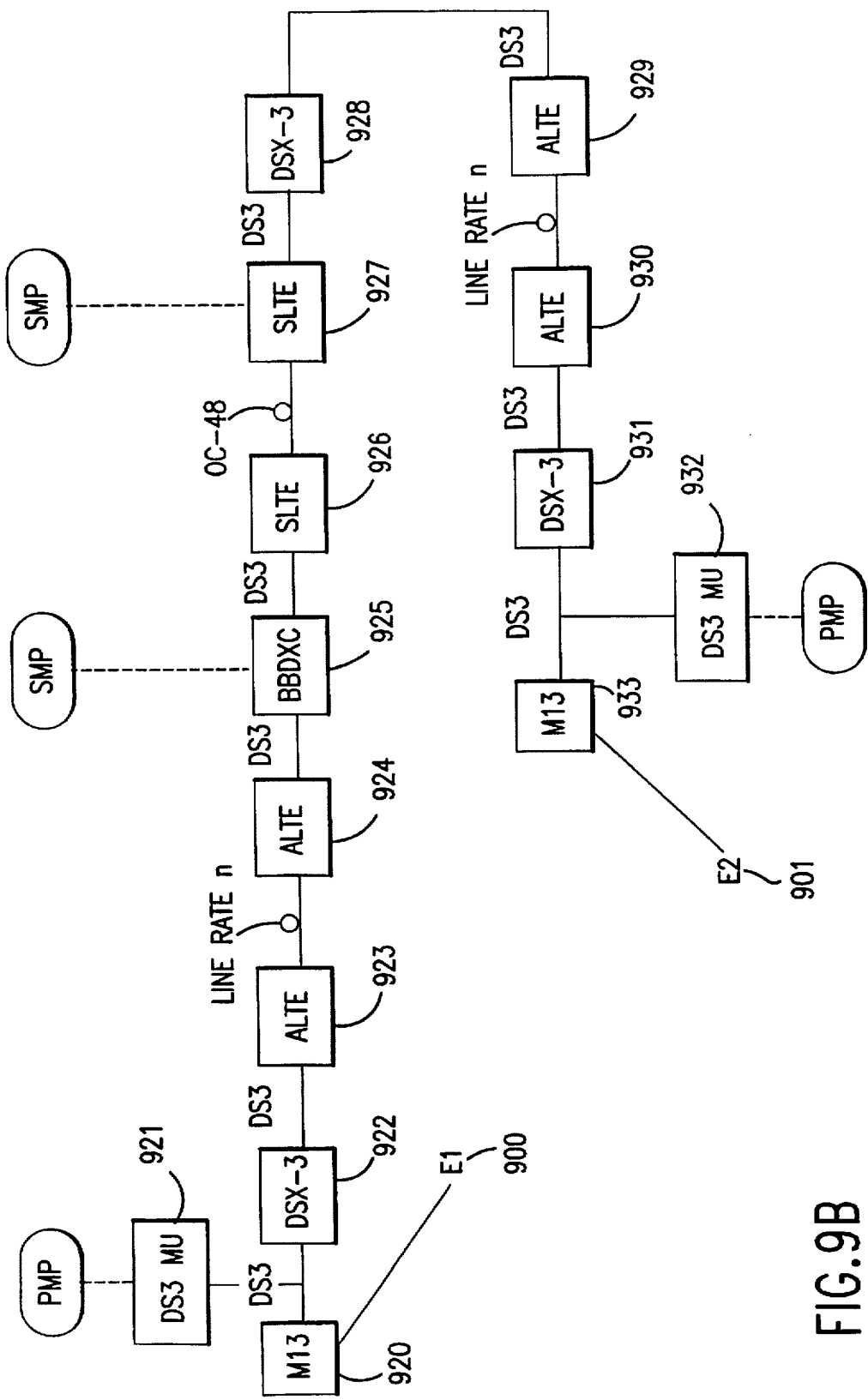
FIG. 9B illustrates the circuit topology between two endpoints along an asynchronous-SONET-asynchronous communication path.
Figure 9C:
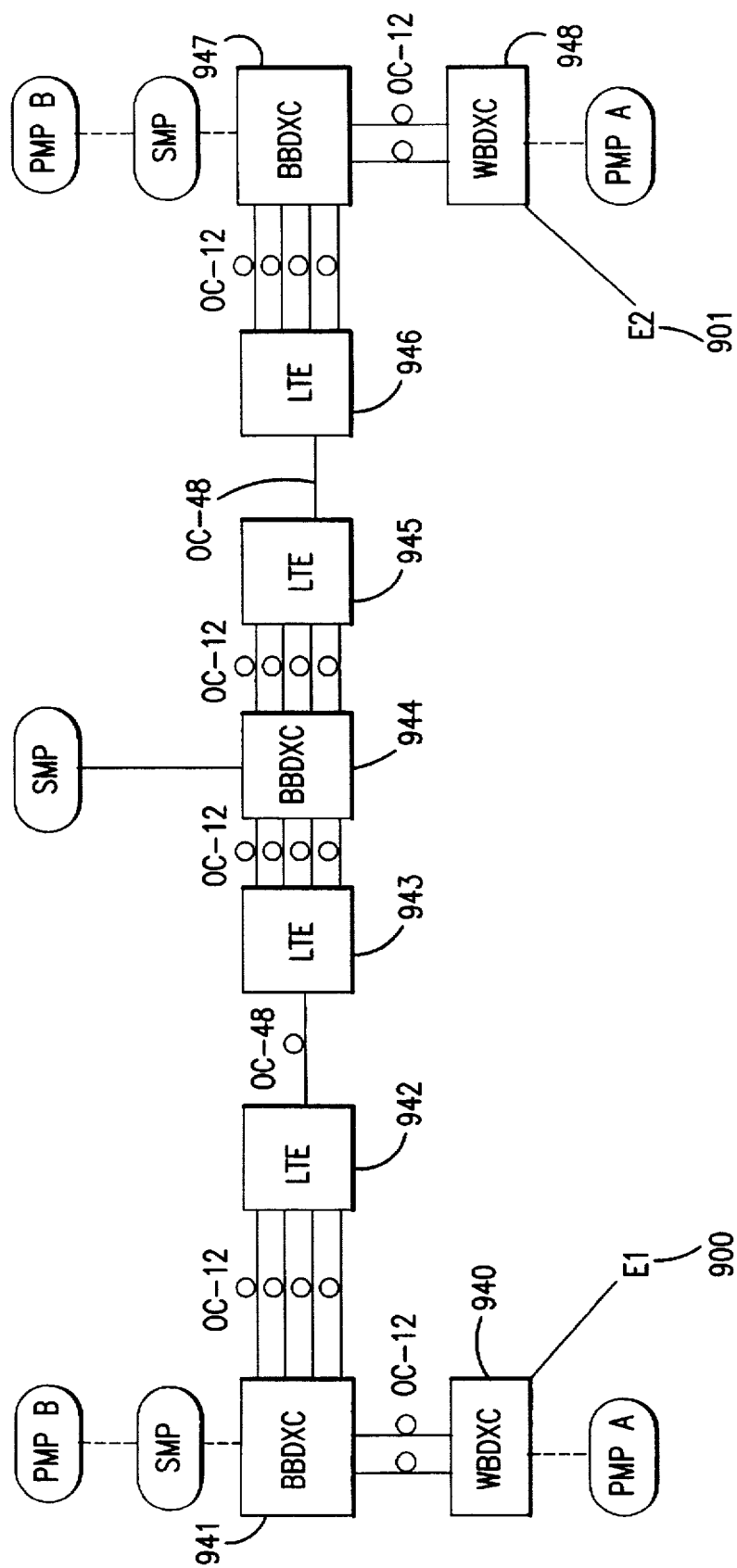
FIG. 9C illustrates the circuit topology between two endpoints along a SONET communication path.

Monitoring points can be identified for a variety of paths through various network elements. FIGS. 9A–9C illustrate examples of paths that traverse asynchronous and SONET network elements.

FIG. 9A shows an exemplary circuit topology between endpoints E1 900 and E2 901 along an asynchronous communication path. E1 900 is connected to E2 901 via a series of network elements and digital circuits. E1 900 is directly connected to M13 multiplexer 902, and E2 901 is directly connected to M13 multiplexer 914.

The asynchronous communication path between M13 multiplexer 902 and M13 multiplexer 914 is described as follows. An asynchronous DS3 circuit is output from M13 multiplexer 902 to digital cross-connect system (DSX-3) 904. DSX-3 904 provides a routing function for multiple asynchronous DS3 circuits with the node in which it resides. DSX-3 904 then sends the asynchronous DS3 circuit to asynchronous LTE (ALTE) 905. An asynchronous fiberoptic link of line rate n connects ALTE 905 to ALTE 906. After ALTE 906 demultiplexes the received signal, the DS3 is passed to DSX-3 908. The asynchronous DS3 circuit then traverses a path through ALTE 910, ALTE 911, DSX-3 912 and M13 914.

FIG. 9B shows an exemplary circuit topology between endpoints E1 900 and E2 901 along a hybrid path, i.e., via an asynchronous-SONET-asynchronous communication path. In this example, a DS3 circuit traverses M13 920, DSX-3 922, a first asynchronous system divided by ALTEs 923 and 924, BBDCS 925, a SONET system defined by SLTEs 926 and 927, DSX-3 928, and a second asynchronous system defined by ALTEs 929 and 930, DSX-3 931 and M13 933.

FIG. 9C shows an exemplary circuit topology between endpoints E1 900 and E2 901 along a SONET communication path. Specifically, the SONET path can be described as follows. First, it should be noted that E1 900 is connected to WBDCS 940 and E2 901 is connected to WBDCS 948, which are network elements capable of providing access to a SONET network (as are SLTEs, inter alia). A SONET OC-12 fiberoptic link connects WBDCS 940 to BBDCS 941. A SONET OC-12 fiberoptic link connects BBDCS 941 with LTE 942. A SONET OC-48 fiberoptic link connects LTE 942 with LTE 943. A SONET OC-12 fiberoptic link connects LTE 942 with BBDCS 944. A SONET OC-12 fiberoptic link connects BBDCS 944 with LTE 945. A SONET OC-48 fiberoptic link connects LTE 945 with LTE 946. A SONET OC-12 fiberoptic link connects LTE 946 with BBDCS 947. A SONET OC-12 fiberoptic link connects BBDCS 947 with WBDCS 948.

The performance monitoring task provided by the NEs functions at three different levels: (1) at the level of the physical entities (electrical or photonic), (2) at the level of the facilities over which communication is established across the path, and (3) at the level of function of the NEs within the path.

For an asynchronous connection, NE monitoring at the physical entities level and the functional level are combined by definition. Monitoring at the line level refers to monitoring at the physical entities level, e.g., monitoring of the bipolar signal traversing the metallic transmission medium. However, monitoring at the path level refers to the monitoring of the framed digital signal between endpoints E1 900 and E2 901 without regard to the physical connection between endpoints E1 900 and E2 901.

For a SONET connection, monitoring at the physical entities level refers to monitoring at the media connecting two facilities together. For an OC-n signal, monitoring occurs in an optical medium. For an STS-n signal, monitoring occurs in an electrical medium.

For both asynchronous and SONET connections, NE monitoring at the facility level refers to monitoring at the digital bit rates over which communication is established, e.g., DS1, DS3, VT-n, STS-n, inter alia. An error event detected at a higher bit rate is not necessarily detectable at a lower bit rate in the digital bit rate hierarchy. For example, bursty errors at a higher bit rate may affect only some of the lower bit rates, while a continuous error stream may affect all the lower bit rates. For this reason, performance is monitored at the various bit rates separately.

For a SONET connection, monitoring at the functional level occurs at the line, section, and physical levels. Monitoring at the path level refers to monitoring information in the path overhead 403 (shown in FIG. 4). Monitoring at the line level refers to monitoring information in the line overhead 402. Monitoring at the section level refers to monitoring information in the section overhead 401.

Figure 10A:
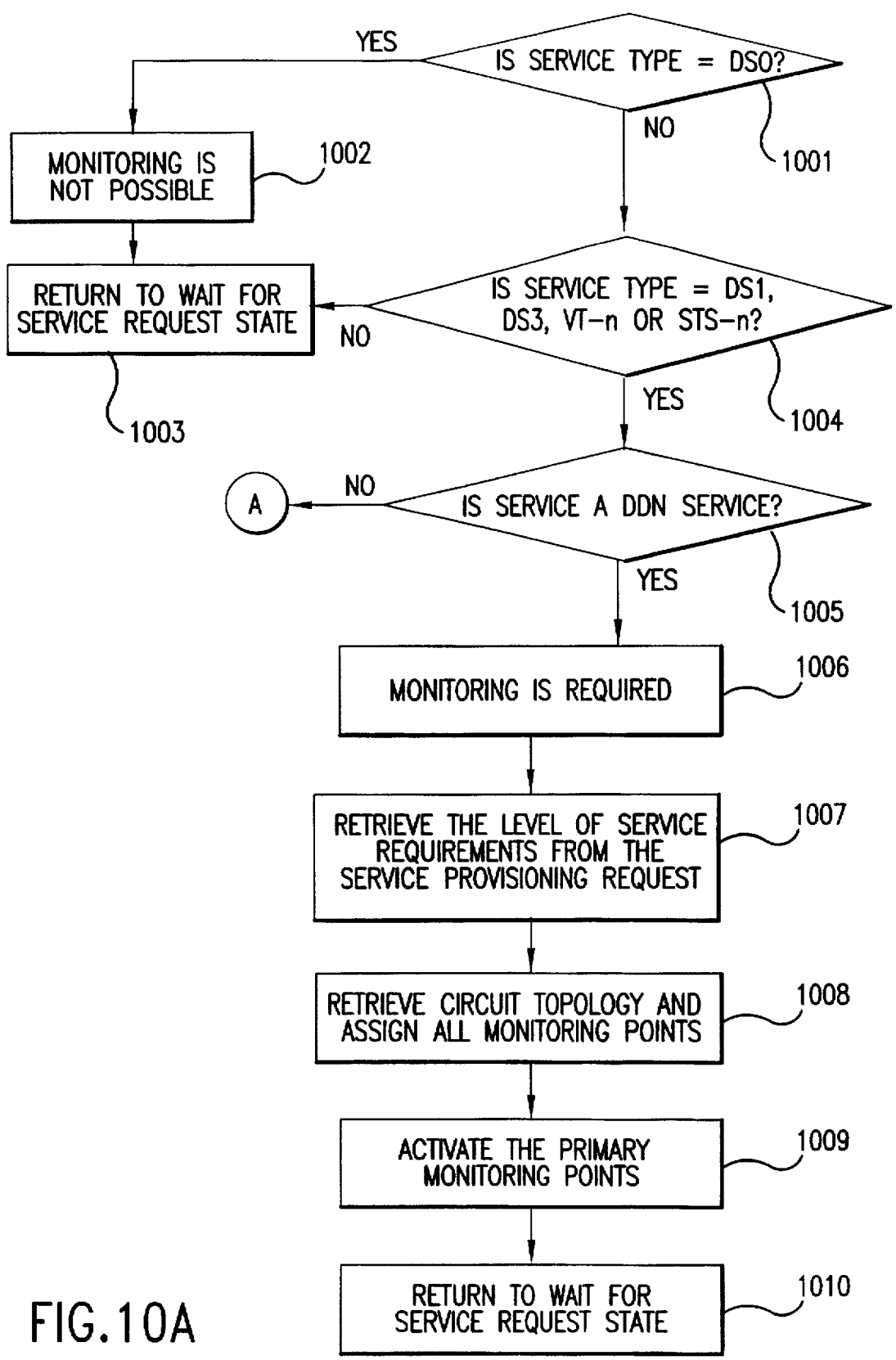
FIGS. 10A–10B are flow charts illustrating a monitoring point identification process.

Having identified various circuit topologies that can be monitored and the performance monitoring tasks, a monitoring point identification process is now described with reference to FIGS. 10A–10B.

In step 1001, the SML configuration manager 631 determines whether the digital circuit requested by the customer is a DS0 circuit. Since performance monitoring is not supported for DS0 circuits, a determination that the circuit specified in the service provisioning request is a DS0 circuit (step 1002) will halt processing and result in a return by SML 630 to the state of waiting for a service provisioning request in step 1003.

Referring to the exemplary circuit topologies of FIGS. 9A–9C, if a customer desires a connection between endpoints E1, E2 such that only a DS0 connection is provided between the endpoints, then performance monitoring would not be supported for that service provisioning request.

In step 1004, the SML configuration manager 631 determines whether the service type requested in the service provisioning request is a DS1, DS3, VT-n, or an STS-n service (where n is a parameter designating the bit rate of the connection). If SML configuration manager 631 determines, at step 1004, that the service provisioning request indicates an acceptable service type, then SML 630 processing of the service provisioning request continues to step 1005. If SML configuration manager 631 determines, at step 1004, that it is an unacceptable service type, then SML 630 processing of the service provisioning request is halted and SML 630 returns to the state of waiting for a service provisioning request in step 1003.

In step 1005, SML 630 determines whether the service provisioning request specifies a DDN (digital data network) service. Since digital data services such as video require a high level (quality) of service, performance monitoring is always required for digital data services. In contrast, voice channels seldom require such high levels of service and will not be monitored unless specified by the customer in the service provisioning request. If the service provisioning request indicates that a digital data service is required, then processing continues to step 1006. At step 1006, monitoring is presumptively required. Otherwise, if the service provisioning request indicates that a digital data service is not required, then processing continues to 1011 of FIG. 10B.

In step 1007, SML 630 retrieves the level of service requirements from the service provisioning request. The level of service requirements determine the quality of service that is to be assigned to the service requested in the service provisioning request. The higher the level of service required, the greater the number of monitoring points that will be assigned between endpoints E1 900 and E2 901 in the asynchronous (FIG. 9A), hybrid (FIG. 9B), and SONET (FIG. 9C) communication paths.

In step 1008, SML configuration manager 631 retrieves the circuit topology and assigns all of the required monitoring points. As exemplified in FIGS. 9A–9C, the circuit topology refers to all possible communication paths between endpoints E1 900 and E2 901, such endpoints E1 900, E2 901 being designated in the service provisioning request.

SML configuration manager 631 also submits a request to the NML 620 configuration manager to retrieve the loc (PMPs). PMPs are the monitoring points (PMPs). PMPs are the monitoring points that are closest to the endpoints E1 900 and E2 901 for the communication path connecting these endpoints. For an interexchange carrier (IXC) (e.g., MCI Telecommunications Network) which connects local exchange carrier (LEC) facilities together, a PMP may be located at the point of demarcation that distinguishes the two different networks. PMPs must be designated if any performance monitoring is to occur. Accordingly, the NML 630 configuration manager will always submit the locations of the PMPs to the SML.

Referring to FIG. 9A (showing an asynchronous path), M13 multiplexer 902 and M13 multiplexer 914 are NEs to which the endpoints E1 900 and E2 901 are connected. M13 multiplexer 902 and M13 multiplexer 914 lack monitoring capability. Accordingly, SML 630 assigns PMP function to DS3 monitoring units (MUs) 903, 913. Specifically, DS3 MUs 903, 913 monitor the DS3 circuits at points between (1) M13 multiplexer 902 and DSX-3 904, and (2) M13 multiplexer 914 and DSX-3 912.

Referring to FIG. 9B (showing an asynchronous-SONET-asynchronous hybrid path), M13 multiplexer 920 and M13 multiplexer 933 are NEs to which the endpoints E1 900 and E2 901 are connected. Because M13 multiplexer 920 and M13 multiplexer 933 similarly lack monitoring capability, SML 630 assigns PMP function to DS3MUs 921, 932. As shown, DS3 MUs 921, 932 monitor the DS3 circuits at points between (1) M13 multiplexer 920 and DSX-3 922, and (2) M13 multiplexer 933 and DSX-3 931.

Referring to FIG. 9C (showing a SONET path), endpoints E1 900, E2 901 are connected to high speed switches WBDCS 940 and WBDCS 948. Accordingly, SML 630 can assign PMP function to WBDCS 940 and WBDCS 948. However, SML 630 can also assign PMP functions to BBDCS 941 and BBDCS 947, respectively.

The fact that more than one set of NEs may have PMP capability, as illustrated in FIG. 9C, is another important aspect of the present invention. Since more than one NE may have PMP capability, i.e., the ability to extract monitoring information near the endpoints E1 900, E2 901, the PMPs may be identified by order of preference. Since WBDCSs 940, 948 are closest to the endpoints E1 900, E2 901, these PMPs are designated as PMP A. Similarly, since BBDCSs 941, 947 are the PMPs farther away from the endpoints E1 900, E2 901, these PMPs are designated as PMP B.

Based on the level of service required by the customer in the service provisioning request, (see step 1007 above) SML 630 will determine the number of secondary monitoring points (SMPs) that are to provide monitoring information between the endpoints of the path. SMPs are NEs serving as intermediate performance monitoring data collection points located between endpoints E1 900 and E2 901. As noted above, the greater the level of service required by the customer in the service provisioning request, the greater the number of SMPs that will eventually be activated to perform trouble isolation if a defect or failure is detected. In a preferred embodiment, a transmission facility will usually have two SMPs located between the PMPs.

Referring to FIG. 9A (showing an asynchronous path), DS3 MUs 907 and 909 can be assigned as SMPs at the points between ALTE 906 and DSX-3 908, and between DSX-3 908 and ALTE 910, respectively.

Referring to FIG. 9B (showing an asynchronous-SONET-asynchronous hybrid path), BBDCS 925 and SLTE 927 can be assigned as SMPs at intermediate points along the path.

Referring to FIG. 9C (showing a SONET), if WBDCSs 940, 948 are assigned as the PMPs, then BBDCS 941, BBDCS 944, and BBDCS 947 can be assigned as the SMPS. However, if BBDCSs 941, 947 are assigned as the PMPs, then only BBDCS 944 can be assigned as an SMP.

SML configuration manager 631 must submit a request to the NML 620 configuration manager to assign an appropriate number of SMPs along the desired path. As part of its configuration reporting task, NML 620 submits requests to the EML 610 configuration management to assign the appropriate SMPs along the desired path.

More specifically, NML 620 configuration manager submits a request to the appropriate EMs 611, 612. If the connection path is between endpoints E1 900, E2 901 at NE 601 and NE 603, only the configuration manager for EM 611 receives the request because NE 601 and NE 603 share the EM 611 domain. However, if the connection path is between endpoints at NE 601 and NE 606, the configuration managers of both EM 611 and EM 612 receive activation requests.

It should be noted that as part of its configuration reporting task, EML 610 reports the status of the monitoring points to NML 620, i.e., indicating whether the SMPs chosen by SML 630 were correctly assigned. When new NEs are connected along the path between the endpoints, (which were determined from the service provisioning request) the EML 610 report scheduling task schedules the reporting by the new NEs to the NML 620 configuration manager. The NML 620 configuration manager reports the identification status of the SMPs to SML configuration manager 631. This includes the status of any new NEs reported from the lower layer, i.e., from EML 610.

In step 1009, SML configuration manager 631 issues a request to NML 620 for activation of the PMPs. The NML 620 configuration manager routes the request to EML 610 to activate the PMPs. The activated PMPs monitor the path derived from the service provisioning request for degradations and failures. Threshold levels for the PMPs are also set during their activation, as described in the Threshold Setting section below.

Figure 10B:
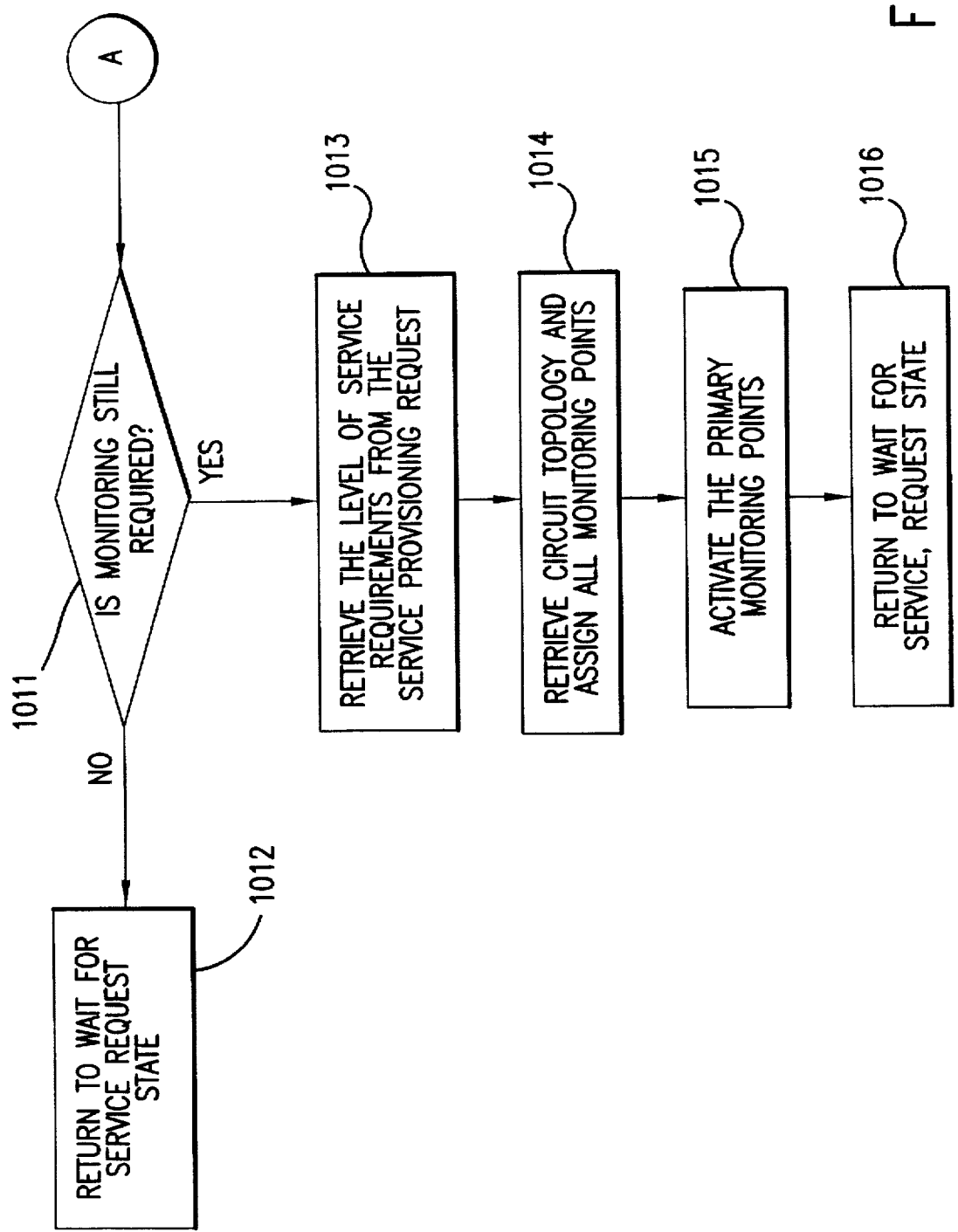

Returning to step 1005, if it is determined that a service request does not involve a DDN service, then the process continues to step 1011 of FIG. 10B. At step 1011, a further determination is made as to whether monitoring is still required. If the service provisioning request indicates that no monitoring is required, then the monitor point identification process is halted and the SML returns to the state of waiting for a new service provisioning request.

However, if monitoring is required in step 1011 because the service provisioning request indicates that monitoring is required, then SML 630 processing continues to steps 1013-1016. In steps 1013-1016, monitoring point identification is processed in a similar manner to steps 1006-1009.

Threshold Setting

Thresholds, which represent error tolerance levels, provide a method for the monitoring points to determine when they should report a problem. Threshold setting between the path endpoints, i.e., end-to-end threshold setting, exists at two levels: (1) reporting general error activity in a particular monitoring period using, for example, the measures of errored seconds (ESs), severely errored seconds (SESs), and unavailability (of a connection), and (2) reporting to an EM the existence of a potential problem, so that trouble isolation can be initiated.

The setting of end-to-end threshold levels is performed based on a customer request (i.e., in the service provisioning request). For PMPs, the threshold levels are typically set when the PMPs are activated. (Refer to Monitoring Point Identification section above.) For SMPs, the threshold levels are typically set when the SMPs are activated. (Refer to Monitoring Point Activation section below.)

Figure 11:
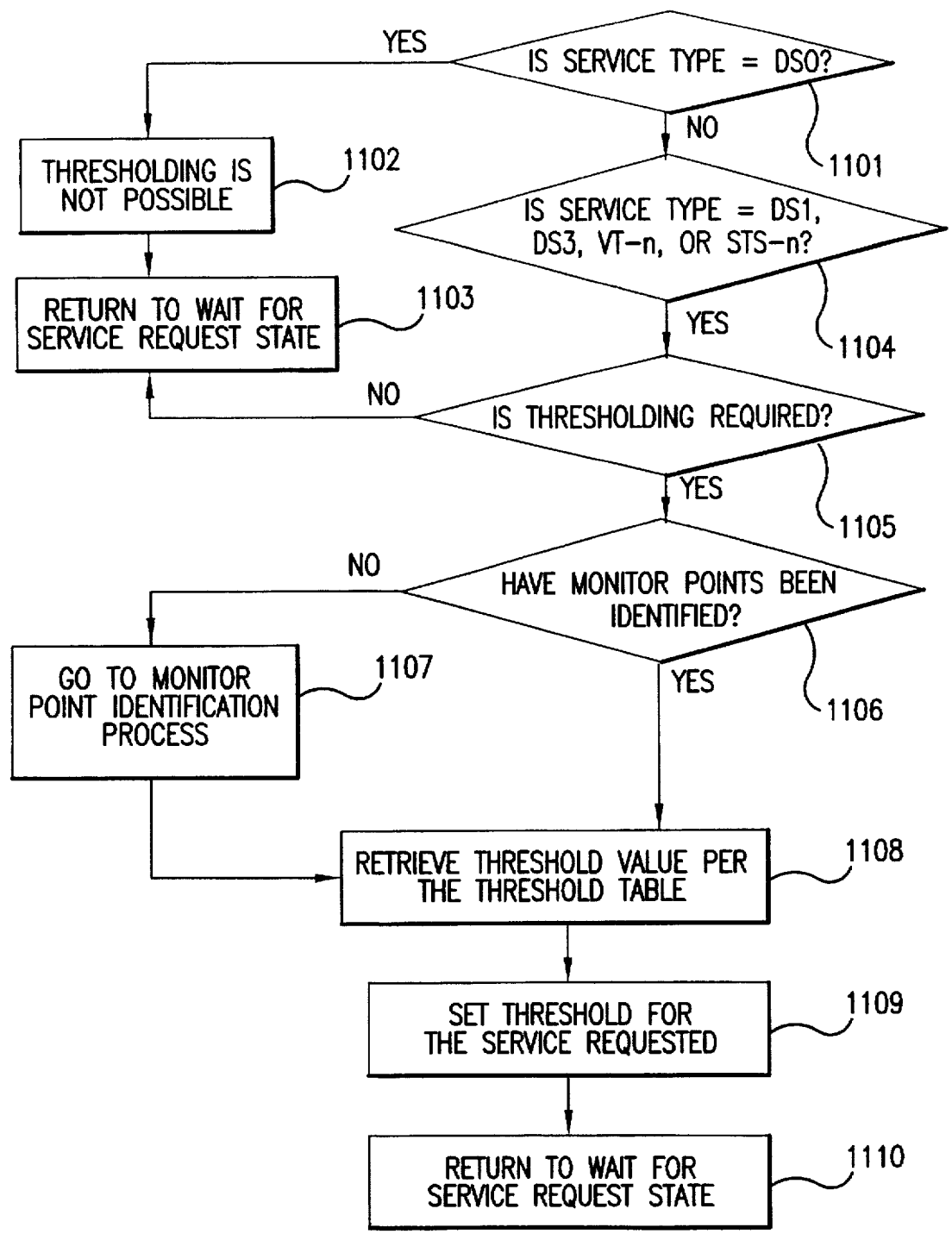
FIG. 11 is a flow chart illustrating the process of threshold setting.

FIG. 11 shows a flow chart demonstrating threshold processing. In step 1101, SML configuration manager 631 determines whether the digital circuit requested by the customer is a DS0 circuit. Since setting of end-to-end thresholds is not supported for DS0 circuits, a determination that the circuit specified in the service provisioning request is a DS0 circuit (step 1101) will halt processing and result in a return by SML 630 to the state of waiting for a service provisioning request (step 1103).

In step 1105, SML configuration manager 631 determines whether the service provisioning request requires setting of end-to-end thresholds. If no thresholding is required, then SML 630 processing of the service provisioning request is halted and SML 630 returns to the state of waiting for a service provisioning request (step 1103).

Contrarily, if in step 1105 SML configuration manager 631 determines that thresholding is required, then SML 630 must determine whether monitor points have been identified for the path in step 1106. If monitoring points have not been identified, then SML configuration manager 631 commences monitoring point identification as provided in step 1107. Here, the SML configuration management commences the process of identifying the monitoring points as provided in the monitoring point identification process described above.

If the monitoring points have already been identified at step 1106, or if the SML 630 monitoring point identification process is commenced in step 1107 and completed, then end-to-end threshold setting is commenced in step 1108.

In step 1108, the threshold values for the monitoring points are derived from: (1) the endpoints E1 900 and E2 901, (2) the end-to-end service quality (i.e., service level), and (3) the circuit path length (which represents the physical distance between endpoints E1 900 and E2 901), all three parameters of which are identified in the service provisioning request.

Accordingly, in step 1109, the service provisioning request is used to retrieve the threshold values from the threshold value table. For example, parameters provided by the user in the service provisioning request can be used as an index to retrieve threshold values from a threshold value table. Note that the circuit path length can be derived from an approximation formula based upon the endpoints and the circuit topology.

More specifically, threshold levels are set at both the PMPs and the SMPs. A threshold level for a particular monitoring point, whether that monitoring point be a PMP or an SMP, is derived by apportioning the customer's desired end-to-end service quality along the approximated distances separating the monitoring points.

As an example, a customer may desire 20 T1s (which use DS1 level service) along the hybrid (asynchronous-SONET-asynchronous) communication path of FIG. 9B with a service level that is 99 percent error free and 99.9 percent available. The same customer may desire 20 T1s along the asynchronous communication path of FIG. 9A at a standard tariff level of service, which is 95 percent error free and 99 percent available.

If the PMPs are to be activated at the end of the Monitoring Point Identification process, or if the SMPs are to be activated at the end of the Monitoring Point Activation process, three parameters are used to derive the acceptable thresholds for the first and second desired services: (1) the desired endpoints E1 900 and E2 901, (2) the end-to-end service quality derived from the customer's service request, i.e., translating the customer's desired service levels into the measures of ES, SES, and unavailability, inter alia and (3) the circuit path length, derived from an approximation based upon the endpoints and the circuit topology.

SML configuration manager 631 can symbolically designate the first service as service A and the second service as service B. Based on the above-mentioned parameters, SML configuration manager 631 sets the threshold measures for each service. More specifically, SML configuration manager 631 sets the threshold measures for each monitoring point (e.g., PMP or SMP) along the path of a desired service. In other words, the respective values of the ES, SES, unavailability, inter alia threshold measures will be stored at the monitoring points along the path of services A and B.

In this same manner, a customer can specify an arbitrary number of threshold measures (e.g., ES, SES, unavailability, inter alia) for each service connection desired via the service provisioning request. SML configuration manager 631 can store these values in table format. SML configuration manager 631 receives reports from the lower layers indicating when the pre-set threshold values have been surpassed. SML configuration manager 631 may then decide to reconfigure the service through different circuits and NEs by submitting a request to the NML configuration management.

Once the process of setting of end-to-end thresholds is completed, the SML returns to the state of waiting for another service provisioning request in step 1110.

Significantly, as NE sensors report information upward through the higher performance monitoring layers, the instant invention permits EML 610 and NML 620 to set threshold values for the monitoring points that are different from the threshold values set by SML 630. Typically, the higher the performance monitoring layer, the higher the threshold that is set. The reason for this is that ideally, it is preferable to detect error activity that may escalate to the threshold level set at SML 630, i.e., the threshold level derived from the customer's required level of service, before the SML threshold level is actually surpassed.

For example, NML 620 may set its threshold level at twenty percent below the SML 630 threshold level, (which was derived as explained above) while EML 610 may set its threshold level at twenty percent below the NML 620 threshold level. In this manner, threshold level setting is handled proactively by the different performance monitoring layers.

Monitoring Point Activation

As noted above, the PMPs are normally activated for monitoring the performance of the service designated as a result of the service provisioning request. However, when a failure or degradation is detected at the PMPs, the SML configuration management must perform performance monitoring/fault isolation to detect the origin of the problem.

Monitoring point activation is a function of the facilities (e.g., digital circuits) used and the services provided on the facilities. Depending on the facilities used and the services provided thereon, detection of a failure at the monitoring points and subsequent activation of the monitoring points may be commenced by EML 610, NML 620, or SML 630.

Figure 12:
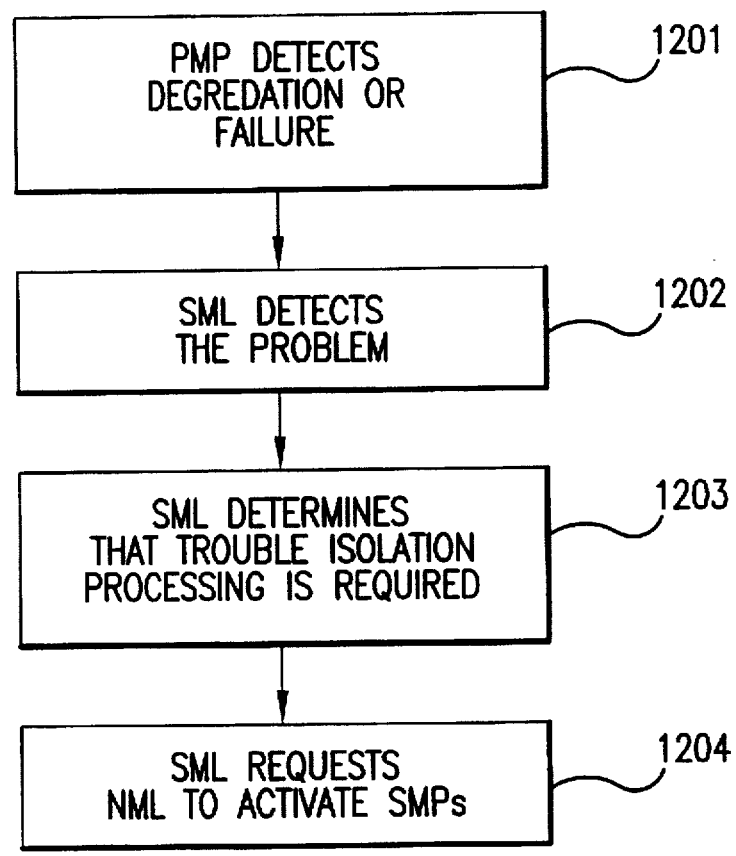
FIG. 12 is a flow chart illustrating the dynamic monitoring point activation process.

FIG. 12 illustrates an example of a monitoring point activation that is controlled by SML 630 when a problem is detected. SML 630 typically has control over monitoring point failure detection and monitoring point activation for a path connection between customer premises, i.e., a dedicated line for a single customer.

In step 1201, a degradation or failure is detected on a PMP. Each EM 611, 612 of the EML 610 has knowledge of the activated NEs within its respective domain and submits regular reports regarding the status of the activated monitoring point NEs within its respective domain to NML 620, as part of its performance monitoring reporting task, which is forwarded to SML 630.

In step 1202, SML 630 determines the existence of a problem detected from the performance monitoring reports forwarded by EML 610. A typical reported error event reported to SML 630 is a threshold crossing alert (TCA), an alert indicating that a performance monitoring parameter has exceeded a predefined threshold. In this manner, SML 630 (which has a full view of the service path for the customer-requested connection) is made aware of any degradations or failures detected at the PMPs through EML 610.

In step 1203, SML 630 determines that trouble isolation process must begin in order to determine the location of the origin of the defect along the path. During trouble isolation processing, SML 630 determines the highest signal transport layer experiencing error activity and identifies theoriginator oat is the originator of the error activity. Specifically, NML 630 determines whether the monitoring points upstream of the monitoring point that reported the TCA have reported similar TCAs or non-zero error activity.

In step 1204, if SML 630 determines that an SMP must be activated, it forwards a request for activation to NML 620. NML 620 issues a request to EML 610 to activate the SMPs during isolation processing as part of its configuration reporting task. Typically, all the SMPs are activated simultaneously for trouble isolation processing, though the SMPs may be turned on sequentially for special processing. SML 620 may also task a portion of the isolation processing to the lower layers.

This process can be repeated until the location of the degradation or fault is determined. Note that the dynamic nature of the activation process optimizes the amount of error activity that is reported to the network management layers. In other words, heightened visibility of the performance of network elements in the network is enabled only when it is needed.

As mentioned, failure detection and monitoring point activation can also be controlled by NML 620. NML 620 typically has control over monitoring point failure detection and monitoring point activation for a path connection used by multiple customers across the backbone of the network. The resulting process is the same as the process described in FIG. 12, except that NML 620 (instead of SML 630) detects the failure and initiates monitoring point activation.

Note that threshold levels for the SMPs are also set during their activation, as described in the Threshold Setting section above.

An Embodiment for Implementing the Invention

Figure 13:
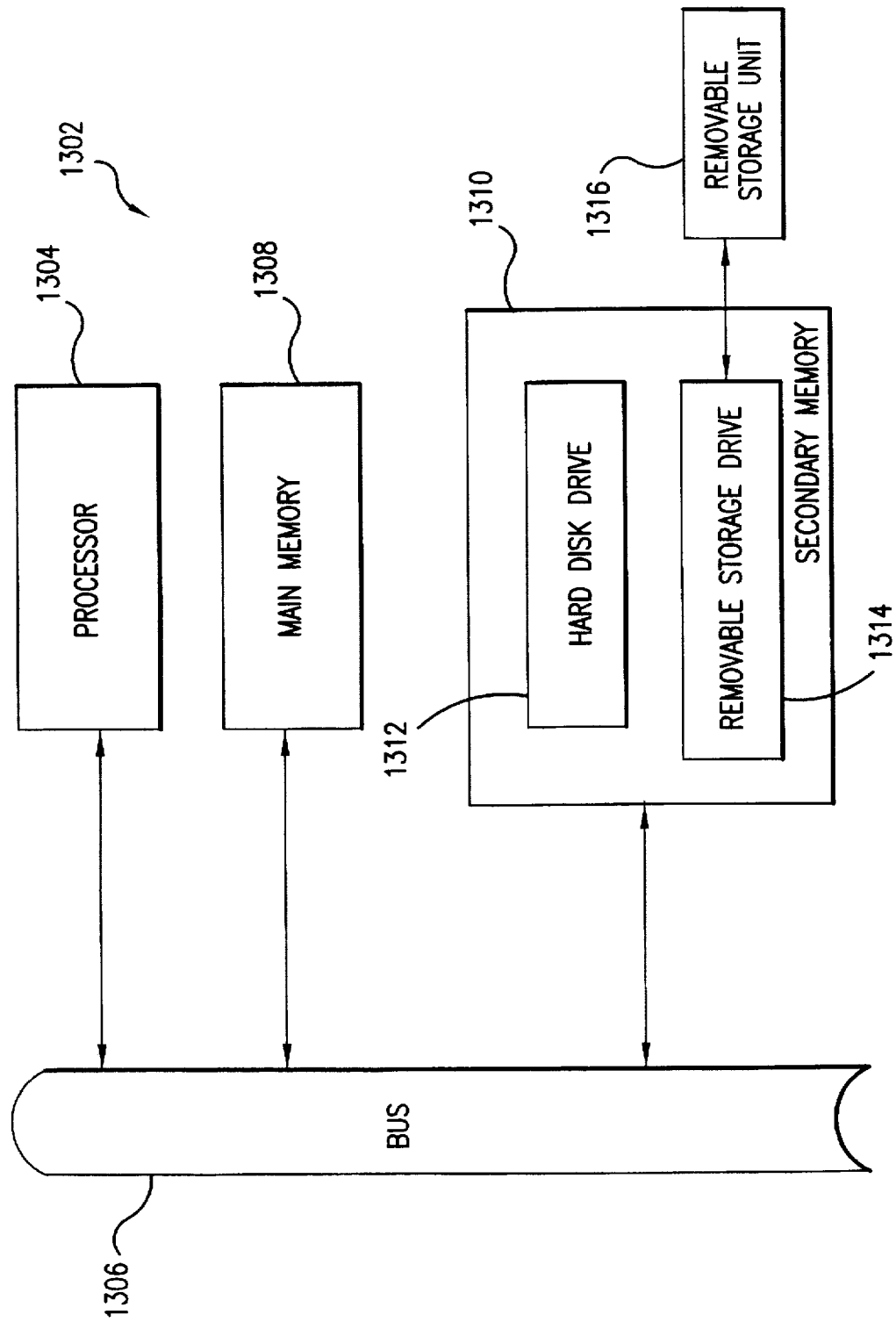
FIG. 13 illustrates a block diagram of a computer useful for implementing elements of the present invention.

In one embodiment, the invention is directed to a computer system operating as discussed herein. For example, functions in each of the network management layers 600–640 are implemented using computer systems. An exemplary computer system 1302 is shown in FIG. 13. The computer system 1302 includes one or more processors, such as processor 1304. The processor 1304 is connected to a communication bus 1306.

The computer system 1302 also includes a main memory 1308, preferably random access memory (RAM), and a secondary memory 1310. The secondary memory 1310 includes, for example, a hard disk drive 1312 and/or a removable storage drive 1314, representing a floppy disk drive, a magnetic tape drive, a compact disk drive, etc. The removable storage drive 1314 reads from and/or writes to a removable storage unit 1316 in a well known manner.

Removable storage unit 1316, also called a program storage device or a computer program product, represents a floppy disk, magnetic tape, compact disk, etc. As will be appreciated, the removable storage unit 1316 includes a computer usable storage medium having stored therein computer software and/or data.

Computer programs (also called computer control logic) are stored in main memory and/or the secondary memory 1310. Such computer programs, when executed, enable the computer system 1302 to perform the features of the present invention as discussed herein. In particular, the computer programs, when executed, enable the processor 1304 to perform the features of the present invention. Accordingly, such computer programs represent controllers of the computer system 1302.

In another embodiment, the invention is directed to a computer program product comprising a computer readable medium having control logic (computer software) stored therein. The control logic, when executed by the processor 1304, causes the processor 1304 to perform the functions of the invention as described herein.

In another embodiment, the invention is implemented primarily in hardware using, for example, a hardware state machine. Implementation of the hardware state machine so as to perform the functions described herein will be apparent to persons skilled in the relevant art(s).

While the invention has been particularly shown and described with reference to preferred embodiments thereof, it will be understood by those skilled in the relevant art that various changes in form and details may be made therein without departing from the spirit and scope of the invention.

What is claimed is:

1. A method of setting end-to-end thresholds for measuring and monitoring circuits in a telecommunications network, comprising the steps of:
   (1) receiving a service provisioning request identifying termination points and a level of service identifying a quality of service desired by a customer;
   (2) identifying a path topology for a provisioned channel between said termination points, said provisioned channel having said level of service;
   (3) if one or more monitoring points for monitoring a performance of said circuits have not been preassigned for said provisioned channel, assigning one or more monitoring points for monitoring a performance of said circuits along said provisioned channel;
   (4) setting the end-to-end thresholds for said provisioned channel by assigning threshold levels at said one or more monitoring points based upon said service provisioning request to indicate when said one or more monitoring points are required to report an error or a potential occurrence of an error.

2. The method of claim 1, wherein step (2) further comprises the step of:
   submitting a request to a network management application to retrieve the possible paths between said termination points.

3. The method of claim 1, wherein step (3) further comprises the steps of:
   (a) retrieving monitoring point requirements from said service provisioning request;
   (b) identifying the location of monitoring points along said path topology.

4. The method of claim 3, wherein step (b) comprises the steps of:
   locating primary monitoring points at or near the ends of said path topology or at network elements located at points of demarcation that distinguish the facilities of an interexchange carrier from the facilities of a local exchange carrier.

5. The method of claim 3, wherein step (b) comprises the steps of:
   locating secondary monitoring points at network elements located at intermediate positions along said path topology, and
   wherein the number of secondary monitoring points selected is based upon the level of service provided in the service provisioning request.

6. The method of claim 1, wherein step (4) comprises:
   setting an end-to-end threshold for said path topology based upon the location of said termination points and said level of service.

7. The method of claim 1, comprising:
   setting said end-to-end threshold based upon the length of circuits comprising said provisioned channel.

8. The method of claim 1, wherein each of said end-to-end thresholds reflects an acceptable tolerance in the quality of a service specified in said service provisioning request.

9. A system of setting end-to-end threshold levels for measuring and monitoring circuits in a telecommunications network, comprising:
   means for receiving a service provisioning request identifying termination points and a level of service identifying a quality of service desired by a customer;
   means for identifying a path topology for a provisioned channel between said termination points, said provisioned channel having said level of service;
   means for assigning one or more monitoring points for monitoring a performance of said circuits along said provisioned channel, if one or more monitoring points for monitoring a performance of said circuits have not been preassigned for said provisioned channel;
   means for setting the end-to-end thresholds for said provisioned channel by assigning threshold levels at said one or more monitoring points based upon said service provisioning request to indicate when said one or more monitoring points are required to report an error or a potential occurrence of an error.

10. The system of claim 9, wherein said means for identifying a path topology further comprises:
    means for submitting a request to a network management application to retrieve the possible paths between said termination points.

11. The system of claim 9, wherein said means for assigning one or more monitoring points along said provisioned channel further comprises:
    means for retrieving monitoring point requirements from said service provisioning request;
    means for identifying the location of monitoring points along said path topology.

12. The system of claim 11, wherein said means for identifying the location of monitoring points along said path topology comprises:

means for locating primary monitoring points at or near the ends of said path topology or at network elements located at points of demarcation that distinguish the facilities of an interexchange carrier from the facilities of a local exchange carrier.

13. The system of claim 11, wherein said means for identifying the location of monitoring points along said path topology comprises:

means for locating secondary monitoring points at network elements located at intermediate positions along said path topology,
  wherein the number of secondary monitoring points selected is based upon the level of service provided in the service provisioning request.

14. The system of claim 9, wherein said means for setting end-to-end thresholds for said provisioned channel comprises:

means for setting an end-to-end threshold for said path topology based upon the location of said termination points and said level of service.

15. The system of claim 9, wherein said means for setting end-to-end thresholds for said provisioned channel comprises:

means for setting said end-to-end threshold based upon the length of circuits comprising said provisioned channel.

16. The system of claim 9, wherein each of said end-to-end thresholds reflects an acceptable tolerance in the quality of a service specified in said service provisioning request.

* * * * *